United States Patent [19]

Oshima

[11] Patent Number: 5,398,489
[45] Date of Patent: Mar. 21, 1995

[54] LAWN MOWER WITH VERTICAL ADJUSTMENT

[75] Inventor: Hiroshi Oshima, Sakai, Japan

[73] Assignee: Kubota Corporation, Japan

[21] Appl. No.: 967,144

[22] Filed: Oct. 27, 1992

[30] Foreign Application Priority Data

Nov. 8, 1991 [JP] Japan .................. 3-292607
Nov. 11, 1991 [JP] Japan .................. 3-293996

[51] Int. Cl.6 .......................... A01D 34/74
[52] U.S. Cl. .................... 56/17.2; 56/320.1
[58] Field of Search .............. 56/17.1, 17.2, 17.5, 56/320.1, DIG. 20, DIG. 24

[56] References Cited

U.S. PATENT DOCUMENTS

| | | | |
|---|---|---|---|
| 2,810,251 | 10/1957 | Shippey | 56/17.1 |
| 3,537,720 | 11/1970 | Irgens | 56/17.2 X |
| 3,759,023 | 9/1973 | Comer | 56/320.1 |
| 4,172,351 | 10/1979 | Scanland | 56/320.1 |
| 4,811,552 | 3/1989 | Fujimoto | 56/11.8 |
| 4,942,726 | 7/1990 | Bowditch | 56/17.2 |
| 5,020,310 | 6/1991 | Oshima et al. | 56/17.2 |

FOREIGN PATENT DOCUMENTS

| | | | |
|---|---|---|---|
| 0300383 | 1/1989 | European Pat. Off. . | |
| 355365 | 2/1990 | European Pat. Off. | 56/17.1 |
| 254606 | 4/1990 | Japan . | |
| 2054333 | 2/1981 | United Kingdom | 56/320.1 |
| 9301706 | 2/1993 | WIPO . | |

*Primary Examiner*—David J. Bagnell
*Attorney, Agent, or Firm*—Webb Ziesenheim Bruening Logsdon Orkin & Hanson

[57] ABSTRACT

A walking operator type lawn mower including front wheels, rear wheels and a frame assembly having a forward portion supported by the front wheels and a rearward portion supported by the rear wheels is disclosed. The mower includes a steering handle and a mower deck mounted between the front wheels and rear wheels. The motor deck includes a motor section mounted in an upper portion thereof and cutting blades mounted in a lower portion thereof. The frame assembly includes a right side frame and a left side frame having lower ends thereof lying close to the ground surface. The steering handle extends upwardly from the frame assembly. The mower deck is mounted between the right and left side frames. The mower deck is vertically movable through a link mechanism which has one end thereof connected to the frame assembly and the other end connected to the mower deck. The right and left side frames have lower ends disposed at a fixed distance to the ground surface regardless of the vertical movement of the mower deck.

4 Claims, 5 Drawing Sheets

LAWN MOWER WITH VERTICAL ADJUSTMENT

BACKGROUND OF THE INVENTION

1. Field of the Invention

The present invention relates to a walking operator type lawn mower which enables cutting height adjustment.

2. Description of the Related Art

In a conventional walking operator type lawn mower, a mower deck is attached to a mower body having rear wheels and an engine, through a plurality of mounting bores arranged vertically in forward positions of the body. Front wheels are vertically adjustably attached to a forward end of the mower deck. A cutting height is varied by varying bolt fixing positions of the front wheels relative to the mower deck, and bolt fixing positions of the body relative to the mower deck. Such a lawn mower is known from U.S. Pat. No. 5,020,310, for example. Further, as disclosed in U.S. Pat. No. 4,811,552, a lawn mower includes a mower deck having side walls and an upper wall defining a cutting space for accommodating blades, and an engine mounted on an upper position of the mower deck. Four, front and rear, wheels are connected to the mower deck, each wheel being pivotable relative to the mower deck, and adjustor levers are provided for pivoting the four wheels, respectively.

With the first-mentioned lawn mower, mounting bolts provided in forward and rear positions of the mower deck must be removed and then tightened each time a cutting height is varied. Further, in the total absence of a cover for covering the mower deck, the lawn mower is not satisfactory in appearance. In the case of the latter lawn mower, a cutting height is varied by operating the adjustor levers to vertically pivot the wheels. At this time, the mower deck and the engine are vertically moved, thereby varying a distance between lower ends of the side walls of the mower deck and the ground.

Thus, with both lawn mowers, grass clippings would be scattered through the spaces between the ground and the lower ends of the side walls of the mower deck when a high cutting level is selected to increase a distance between the blades and the ground. Further, these lawn mowers present a disagreeable appearance when the lower ends of the side walls of the mower deck are greatly spaced from the ground.

SUMMARY OF THE INVENTION

The object of the present invention is to provide an improved walking operator type lawn mower having a frame structure for preventing grass clippings from scattering out of the mower deck even when a cutting level is raised.

The above object is fulfilled, according to the present invention, by a lawn mower wherein a frame assembly supported by wheels includes a right side frame and a left side frame having lower ends thereof lying close to ground surfaces, a mower deck is mounted between the right and left side flames, the mower deck is vertically movable through a link mechanism having one end thereof connected to the frame assembly, and the other end connected to the mower deck, and a steering handle extends upwardly from the frame assembly.

According to this construction, when the mower deck is vertically moved to vary a cutting height, a distance between a lower end of the mower deck and the ground is varied but lower surfaces of the body remain in the same height above the ground. Moreover, since the lower ends of the right and left side frames are set to a low level above the ground, scattering of grass clippings is suppressed. The steering handle is connected to the frame assembly which is vertically immovable. This enables the operator to steer the mower always at the same steering position which is unchangeable regardless of cutting height variations.

In a preferred embodiment of the invention, the mower deck has a cover for covering the mower deck, the cover having portions vertically overlapping upper portions of the frame assembly. The overlapping portions have a length greater than a distance through which the mower deck is vertically movable.

With this construction, the right and left side frames and the cover of the mower deck overlap each other in side view regardless of a relative vertical movement therebetween. This prevents entry of floating grass clippings, and suppresses propagation through the air of noise from a motor section and blades.

Other features and advantages of the invention will be apparent from the following description of the preferred embodiment taken with reference to the accompanying drawings.

DETAILED DESCRIPTION OF THE PREFERRED EMBODIMENT

Figure 1A:
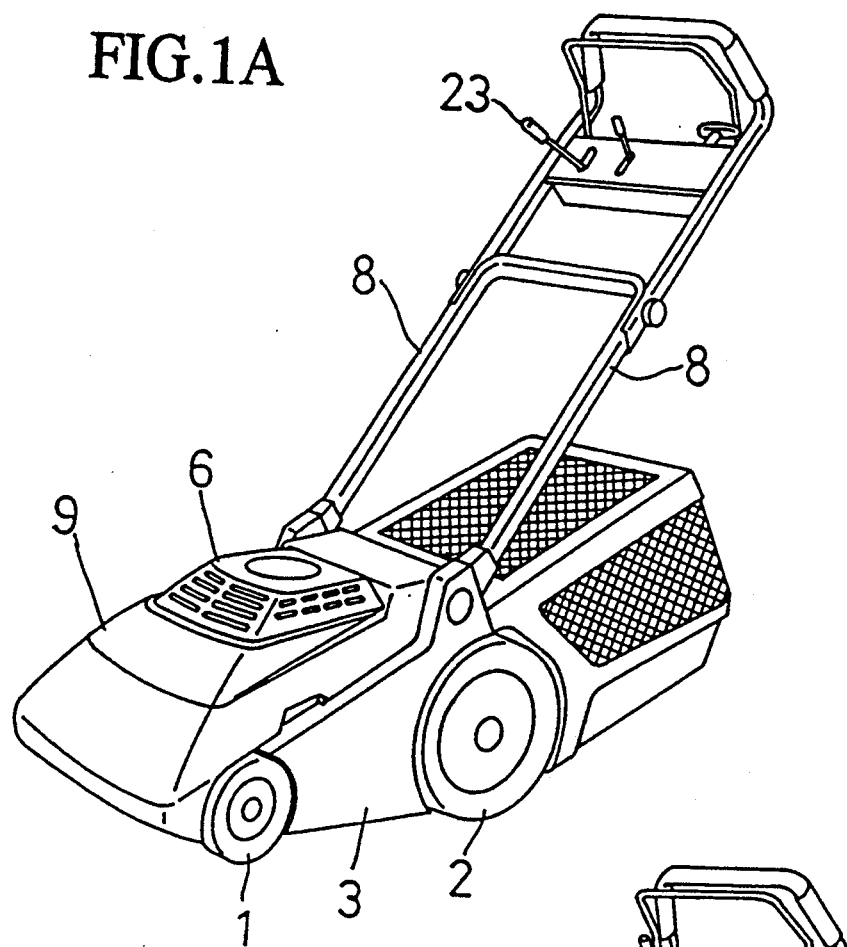
FIG. 1A is a perspective view of a lawn mower according to the present invention, adjusted to a low cutting level.
Figure 1B:
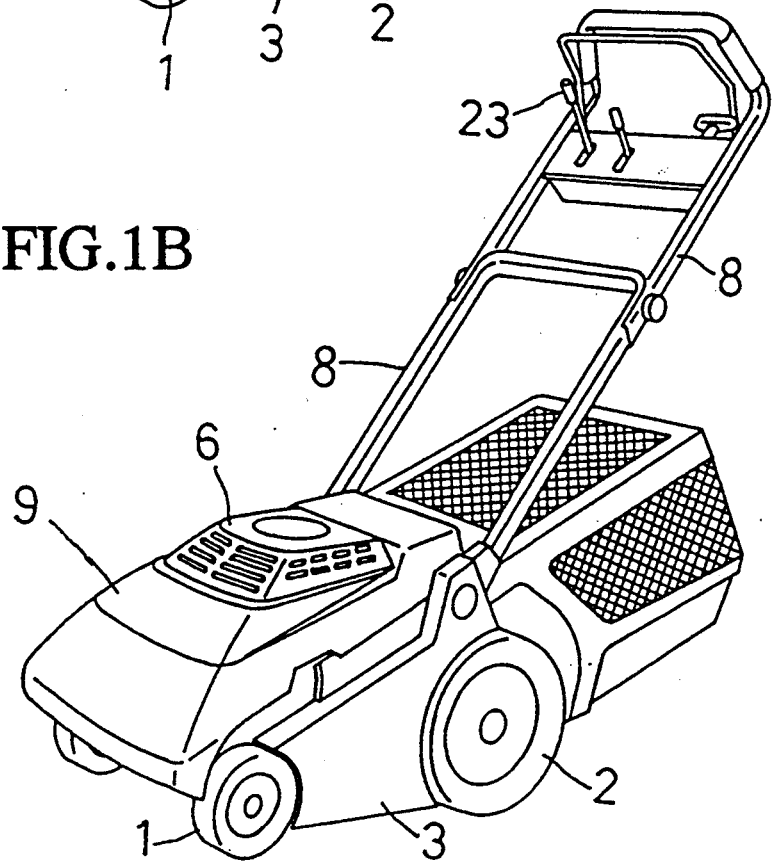
FIG. 1B is a perspective view of the lawn mower adjusted to a high cutting level.

FIGS. 1A and 1B show a walking operator type lawn mower according to the present invention. In FIG. 1A the lawn mower is set to a low cutting level, and in FIG. 1B the lawn mower is set to a high cutting level. As seen from FIG. 2, the mower has front wheels 1, rear wheels 2, and a frame assembly 30 including a left side frame 3A and a right side frame 3B supported by the front and rear wheels 1 and 2. A mower deck 4 is mounted between the left and right side frames 3A and 3B. An engine 6 and a transmission case 7 are arranged on the mower deck 4. The mower deck 4 is in the form of a case including side walls 10 defining a lower space. This lower space accommodates cutting blades 11 connected to a vertical output shaft 12 of the engine 6. An engine cover 9 is attached to a forward end of the mower deck 4 for covering the engine 6 and mower deck 4 from above. A steering handle 8 extends rearwardly from upper rear surfaces of the left and right side frames 3A and 3B.

Figure 2:
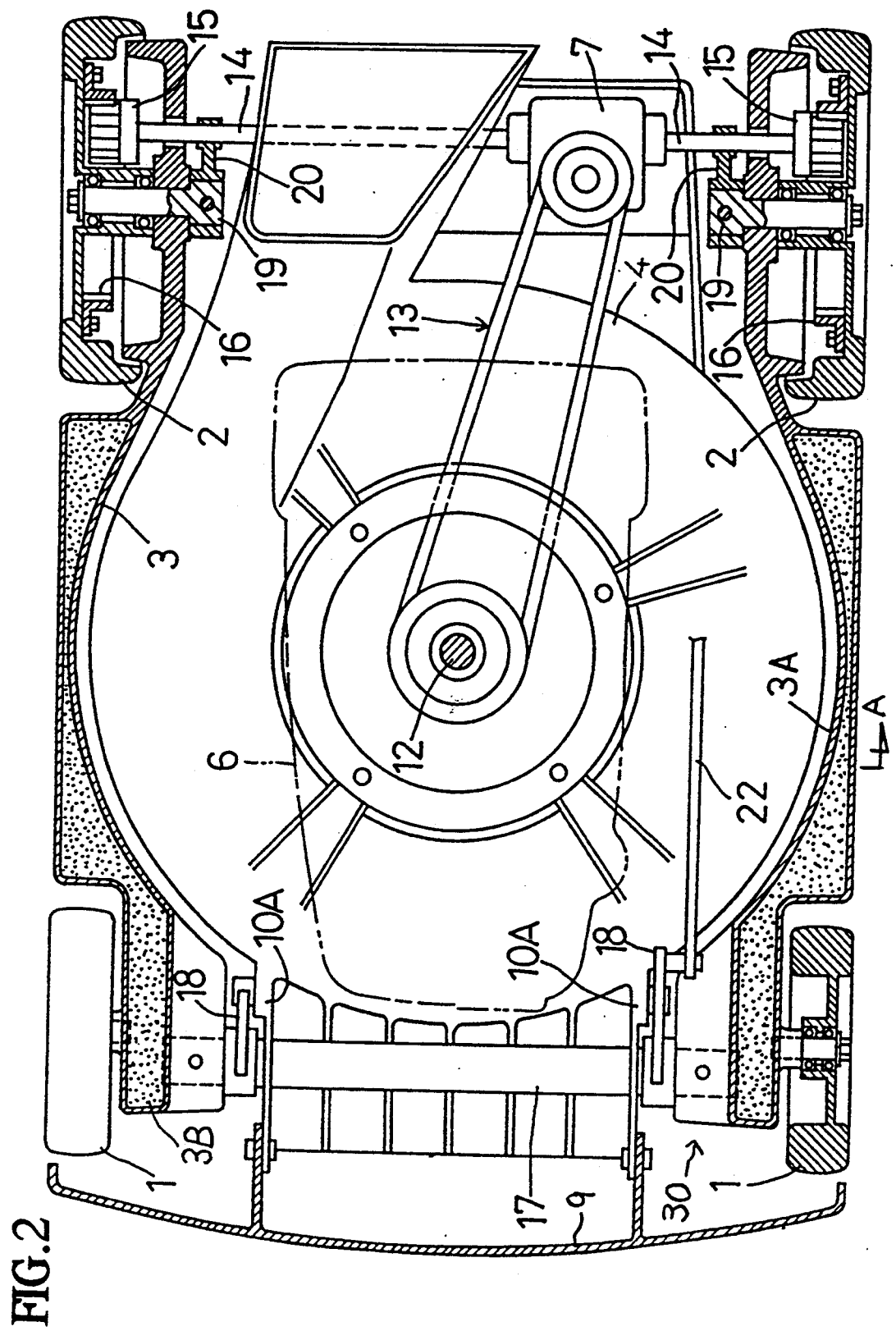
FIG. 2 is a plan view in cross section taken in a direction of arrow B of FIG. 3.
Figure 3:
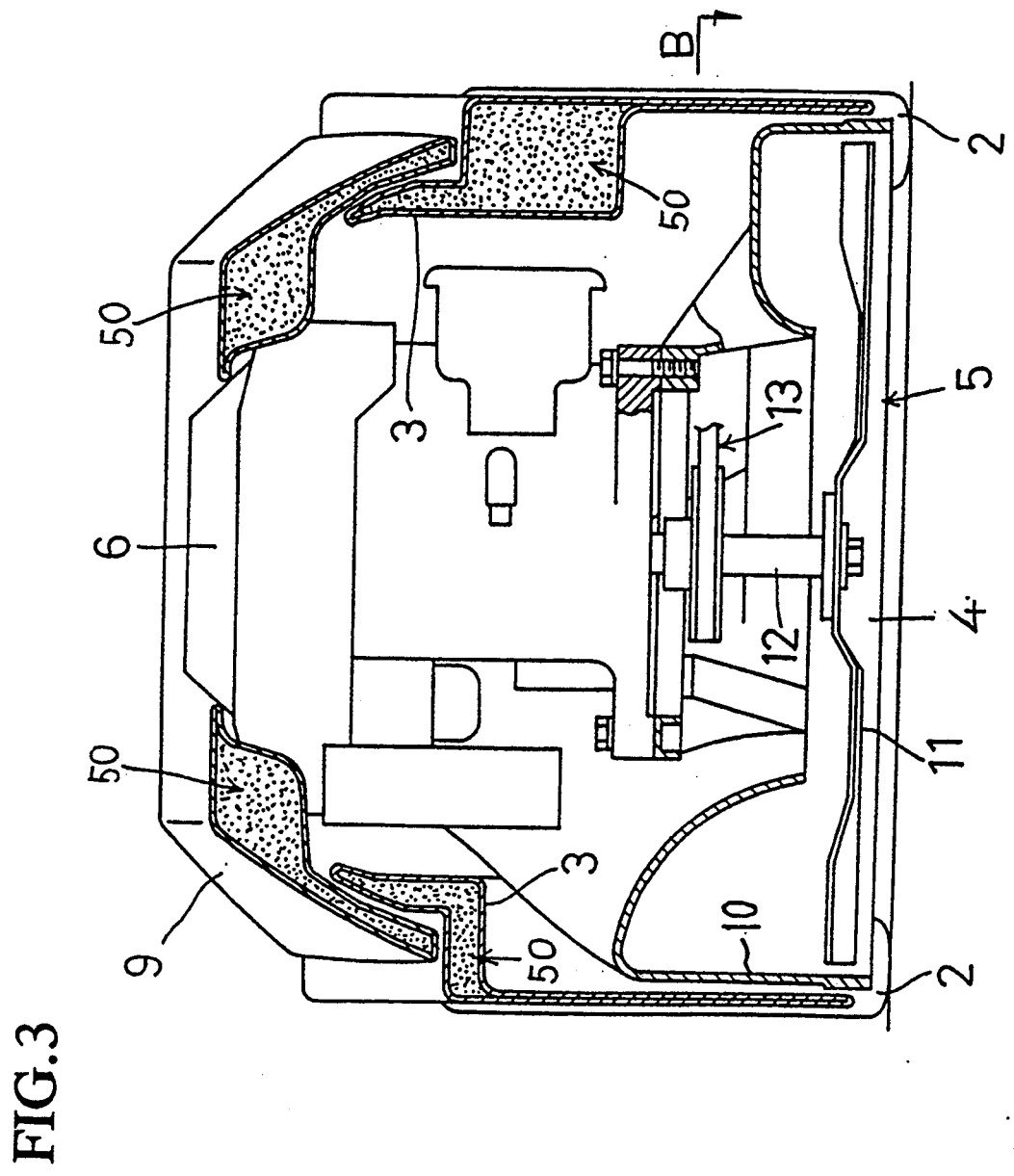
FIG. 3 is a front view in vertical section taken in a direction of arrow A of FIG. 2.

A propelling transmission system for transmitting drive from the engine 6 to the rear wheels 2 will be described next. As shown in FIG. 3, drive is transmitted from the engine 6 to the transmission case 7 disposed near the rear wheels 2 through a belt transmission 13 including pulleys mounted on the output shaft 11 and the transmission case 7 and a belt wound around the pulleys. As shown in FIG. 2, a variable speed output shaft 14 extends through the transmission case 7 toward the right and left rear wheels 2. Drive pinions 15 are mounted on opposite ends of the output shaft 13, and meshed with inner gears 16 of the right and left rear wheels 2, to complete the propelling transmission system. The front wheels 1 are free rotation wheels attached through bearings to axle pins connected to the side frames 3A and 3B.

Figure 4:
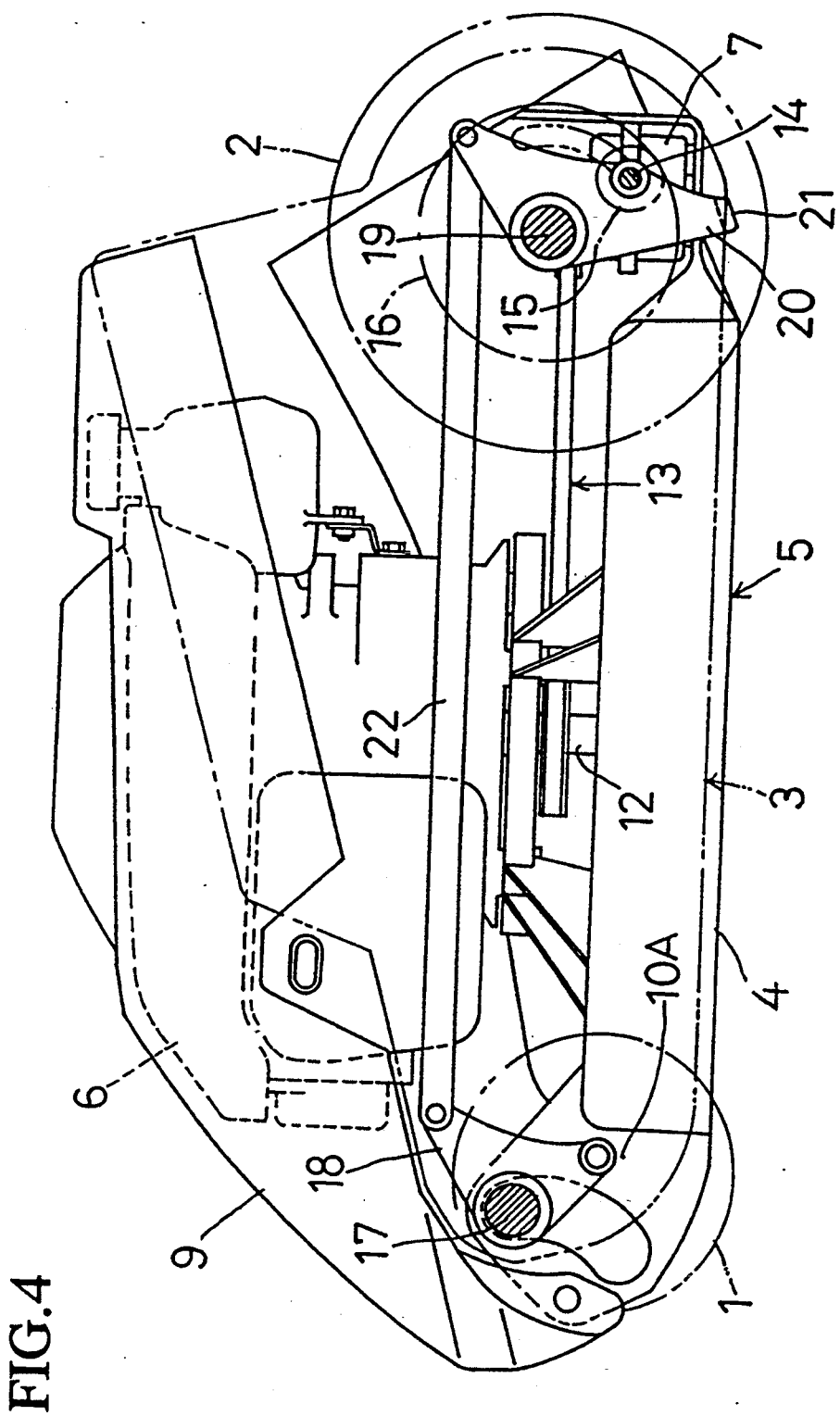
FIG. 4 is a side view showing a mower deck lowered to the lowest level.
Figure 5:
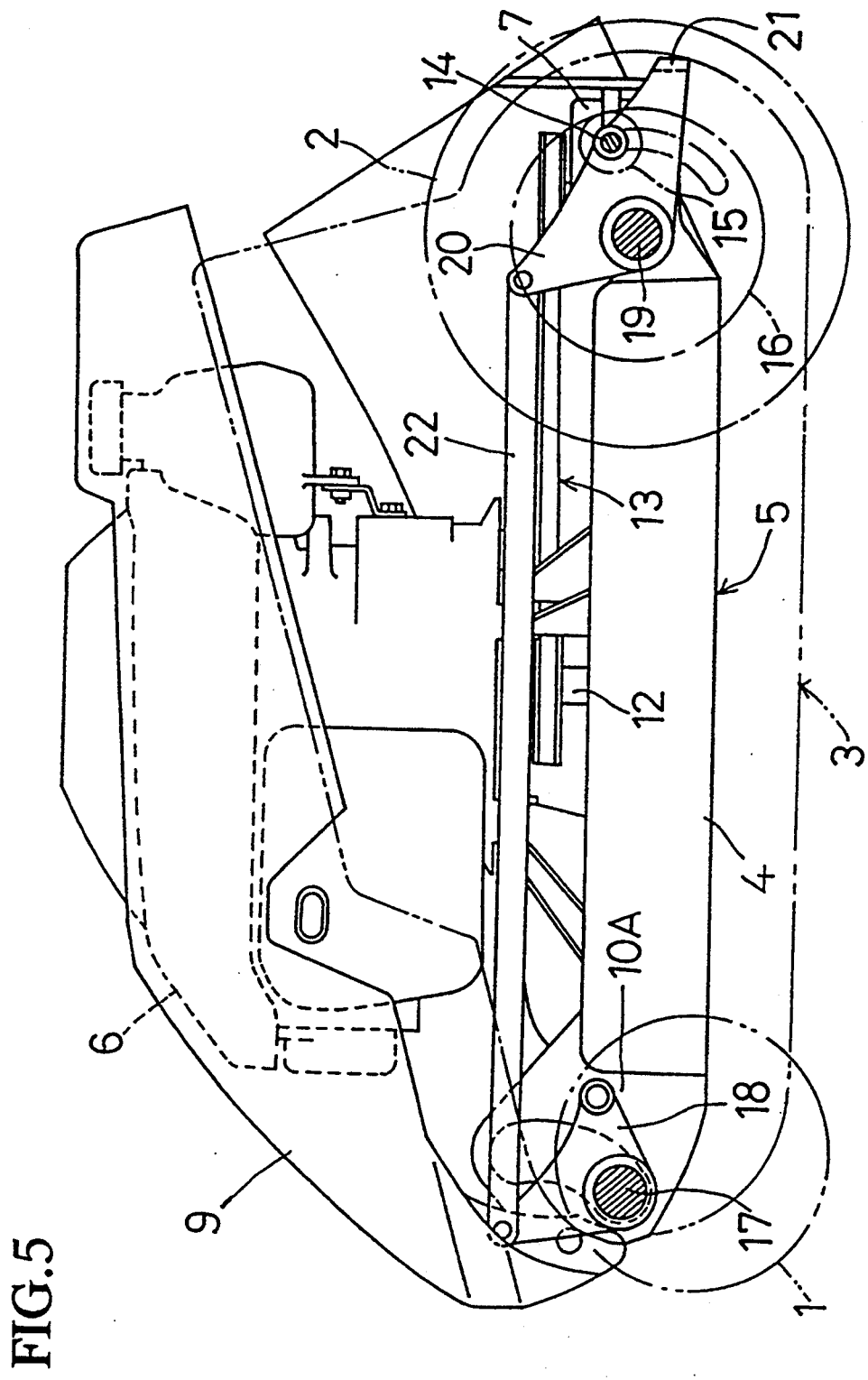
FIG. 5 is a side view showing the mower deck raised to the highest level.

A structure for raising and lowering the mower deck 4 will be described next. As shown in FIGS. 2, 4 and 5, a transverse support shaft 17 extends between forward ends of the left and right side frames 3A and 3B, and supports left and right front swing arms 18 shaped like bell cranks and attached to positions adjacent opposite ends of the support shaft 17 to be pivotable relative thereto. Each swing arm 18 has one end thereof connected to a vertical flange 10A extending from the mower deck 4. The left and right side frames 3A and 3B have left and right rear support shafts 19 extending transversely from rear ends thereof for attaching the rear wheels 2, respectively. A bell crank-like rear swing arm 20 is relatively pivotably attached to an end of each support shaft 19 remote from the rear wheel 2. One end of each swing am 20 is connected to a transverse connecting bar 21 interconnecting the swing arms 20 to be pivotable together. Each swing arm 20 has a bore formed adjacent one end thereof for relatively rotatably receiving the output shaft 14 extending through the transmission case 7 toward the left and right rear wheels 2. The other end of the left front swing arm 18 and the other end of the left rear swing arm 20 are interconnected through a connecting frame 22 extending longitudinally of the lawn mower. Thus, the four, left and right and front and rear, swing arms 18 and 20 are pivotable in unison. Though not shown in detail, the steering handle 8 includes a control lever 23 connected to the left rear swing arm 20. The control lever 23 is pivotable to cause pivotal movement of the front swing arms 18 and rear swing arms 20, thereby to raise or lower the mower deck 4. This operation varies a cutting height.

Constructions of the side frames 3 and engine cover 9 will be described next. Each of these components 3 and 9 is formed of plastics as an integral unit. As shown in FIGS. 2 and 3, these components 3 and 9 include bulged spaces 50 formed in various parts thereof which contains foamed urethane resin. Thus, these components 3 and 9 are lightweight despite the increased thicknesses, and are capable of diminishing leakage of noise of the engine and rotating blades.

The side frames 3 have lower ends lying close to the ground, and their level is maintained constant regardless of the vertical movement of the mower deck 4. Further, the side frames 3 have upper portions thereof overlapping lower portions of the engine cover 9 in side view. These portions overlap each other through a length greater than a distance through which the mower deck 4 is vertically movable, so that the overlapped state is maintained regardless of the vertical movement of the mower deck 4.

While one embodiment of the present invention has been described above, it is pointed out that the scope of the invention is not limited to this embodiment. For example, the left and right side frames 3A and 3B may be just frames instead of being in the form of cases. The mower deck 4 may be raised and lowered automatically by using an actuator such as a cylinder.

What is claimed is:

1. A walking operator type lawn mower comprising:
   front and rear wheels;
   a frame assembly having a forward portion supported by the front wheels, and a rear portion supported by the rear wheels, said frame assembly including a right side frame and a left side frame having lower ends thereof lying close to ground surfaces;
   a steering handle extending upwardly from said frame assembly;
   a mower deck mounted between said right side frame and said left side frame, and including a motor section mounted in an upper portion thereof and cutting blades mounted in a lower portion thereof;
   a link mechanism having one end thereof connected to said frame assembly, and the other end connected to said mower deck, said mower deck being vertically movable through said link mechanism, wherein said mower deck includes a cover for covering said mower deck, said cover having portions vertically overlapping upper portions of said frame assembly, the overlapping portions having a length greater than a distance through which the mower deck is vertically movable; and
   further including a control section mounted in an upper region of said steering handle, wherein a control lever is mounted in said control section for operating said link mechanism.

2. A walking operator type lawn mower comprising:
   front and rear wheels;
   a frame assembly having a forward portion supported by the front wheels, and a rear potion supported by the rear wheels, said frame assembly including a right side frame and a left side frame having lower ends thereof lying close to ground surfaces;
   a steering handle extending upwardly from said frame assembly;
   a mower deck mounted between said right side frame and said left side frame, and including a motor section mounted in an upper portion thereof and cutting blades mounted in a lower portion thereof;
   a link mechanism having one end thereof connected to said frame assembly, and the other end connected to said mower deck, said mower deck being vertically movable through said link mechanism, wherein said link mechanism includes connecting shafts one of which acts also as a transmission shaft for transmitting drive from said motor section to said rear wheels, wherein said link mechanism is pivotable about axes of corresponding wheels, said transmission shaft transmitting drive to said rear wheels through pinions mounted on said transmission shaft and inner gears formed in said rear wheels; and
   further including a control section mounted in an upper region of said steering handle, wherein a control lever is mounted in said control section for operating said link mechanism.

3. A walking operator type lawn mower comprising:
   front and rear wheels;
   a frame assembly having a forward portion supported by the front wheels, and a rear portion supported by the rear wheels, said frame assembly including a right side frame and a left side frame having lower ends thereof lying close to ground surfaces;

a steering handle extending upwardly from said frame assembly;

a mower deck mounted between said right side frame and said left side frame, and including a motor section mounted in an upper portion thereof and cutting blades mounted in a lower portion thereof;

a link mechanism having one end thereof connected to said frame assembly, and the other end connected to said mower deck, said mower deck being vertically movable through said link mechanism, wherein said link mechanism includes connecting shafts one of which acts also as a transmission shaft for transmitting drive from said motor section to said rear wheels; and further including a control section mounted in an upper region of said steering handle, wherein a control lever is mounted in said control section for operating said link mechanism.

4. A walking operator type lawn mower comprising:

a pair of front and rear wheels symmetrically arranged in right and left sides of the mower;

a pair of frames including a left frame and a right frame, each said frame having a forward portion supported by the front wheels, and a rear portion supported by the rear wheels, and lower ends thereof lying close to ground surfaces;

a steering handle connecting said pair of frames, extending upwardly and rearwardly from said pair of frames;

a control section mounted in an upper region of said steering handle;

a mower deck mounted between said right frame and said left frame, and including a motor section mounted in an upper portion thereof and cutting blades mounted in a lower portion thereof; and a link mechanism having one end thereof connected to said pair of frames, and the other end connected to said mower deck, said mower deck being vertically movable through said link mechanism, wherein a control lever is mounted in said control section for operating said link mechanism.

* * * * *